UNITED STATES PATENT OFFICE.

625,656

ALEXANDER DANIEL ELBERS, OF HOBOKEN, NEW JERSEY.

PRODUCT FROM BLAST-FURNACE SLAG.

SPECIFICATION forming part of Letters Patent No. 625,656, dated May 23, 1899.

Application filed January 22, 1898. Serial No. 667,633. (No specimens.)

*To all whom it may concern:*

Be it known that I, ALEXANDER DANIEL ELBERS, of Hoboken, in the county of Hudson and State of New Jersey, have invented a new and Improved Product from Blast-Furnace Slag, of which the following is a full, clear, and exact specification.

The invention consists in an improved product formed by roasting sulfurous blast-furnace slag of suitable composition in its ground or pulverized state in admixture with moderate quantities of alkaline nitrates and by preference with sodium nitrate, as will be hereinafter fully set forth, and pointed out in the claim. The products of this treatment are highly useful as a flux for the manufacture of glass and pottery and as an admixture to hydraulic cements. Pulverized blast-furnace slag cannot be desulfurized in a practical manner by roasting it without suitable admixture or in its crude state because it is apt to rescorify during the progress of the operation before all of the sulfur is out of it. The sulfurous slag has a fixed melting-point and remelts, according to its composition, between light cherry-red heat and incipient white heat; but it becomes more refractory during roasting in the measure that the sulfur is expelled from it. Its principal sulfurous constituent (calcium sulfid) parts with about one-half of its sulfur at about a full red heat, provided the roasting mass admits sufficient of air to oxidize the sulfids to that extent; but it does not lose all of it until the slag particles become sufficiently distended to allow the air to enter readily into their interior, and that condition does not set in until the roastings are heated to at least a light cherry-red heat, or very nearly to the temperature at which they are liable to rescorify, unless the greater portion of the sulfur has already been spent. Moreover, the crude-slag particles are apt to frit or to bake together in a heat that is but slightly higher than the temperature at which the calcium sulfid begins to oxidize. Hence the roastings are apt to become too dense for the proper admission of air before even the first half of their sulfur has been expelled, and in that case they will certainly rescorify during the progress of the heating. The success of the roasting operation depends, therefore, chiefly on the condition that all of the sulfur that can be got rid of at a comparatively low heat be expelled as quickly as possible. This can be best accomplished by roasting the pulverized slag in admixture with moderate quantities of sodium nitrate. This nitrate decomposes gradually and under evolution of free oxygen at a temperature that is somewhat below the fritting-point of the crude slag. The free oxygen being generated within the roasting mass reacts at once energetically on its sulfids, and the outward pressure of the spent gases renders the mass porous, and consequently better adapted to admit the air that is required for the complete desulfurization that sets in at a still higher temperature.

The finished roastings should have the consistency of an easily-friable mass of loosely-adhering pulverulent particles; but in roasting large quantities in the same fire it is likely that some portions will remain unfinished, whereas others may become overburned. The overburned portions, on account of the fritting action of the bases of the spent sulfids and nitrates, are apt to become as dense as pumice-stone and should be ground unless they are to be used as an admixture to cement-clinker, and the underburned roastings, which are easily recognized by their uneven and impure color, can be separated by hand and finished with subsequent charges, so that there is practically no waste.

As regards the specific usefulness of the material, that depends largely on the composition of the crude slag. Thus any kind of blast-furnace slag of the singulo-silicate type is in its desulfurized state an excellent silicifying ingredient for cement, excepting, perhaps, those compositions that are rather high in manganous oxid, and every kind of that type makes a good flux for the coarser kinds of clay products that have to be burned hard, such as the hollow tiles that are used for the floors of fireproof structures. For the finer kinds of pottery and glass the usefulness of desulfurized slag depends largely on the freedom of the crude slag from ferruginous impurities, and for such applications the desulfurized material should be leached and washed. Moreover, there are also applications in the manufacture of colored glass for which various kinds of slag that contain appreciable quantities of combined iron or also of manganous oxid are especially useful.

I now proceed to describe how the process can be carried out. I prefer to use slag that has been cast in cumulative layers, as described in United States Letters Patent No. 579,820, granted to me and dated March 30, 1897, and to grind it dry and so fine that it will pass readily through a sieve of ninety meshes to the linear inch. The slag thus pulverized I mix intimately with sodium nitrate in about the proportion of two per cent. of the latter for each per cent. of the sulfur that the slag contains. The sodium nitrate should be first melted, as it gives then a finer powder, and it may also be ground in admixture with the slag, always provided that the latter is free from carbonaceous matter. I prefer to roast the mixture in saggars, such as are used in burning stone-china ware, and to spread it in the saggars about four inches deep. The saggars should be washed inside with a pure china clay or kaolin, especially the bottom, as that prevents the roasting mass from adhering to them. The charged saggars are then put into kilns and burned in the same way as stone-china. The saggars may also be burned in heating-furnaces, such as are used in reheating steel ingots, with gas as fuel. A charge may require from two to four hours of red heat, about one hour of harder firing, and from one to three hours to cool off, which admits of three to four shifts being made in twenty-four hours. The proper degree of firing is easily determined in actual practice, the methods and contrivances for achieving that end being well known to men who are skilled in similar work.

Instead of using the sodium nitrate I may also admix the crude slag with potassium nitrate, with a mixture of both, or I may first desulfurize the crude slag superficially, as described in the United States Letters Patent before referred to, mix the superficially-desulfurized slag, either in its wet or dry state, with alkaline nitrates, either dry or in solution, and roast the mixture.

In defining my invention more clearly I would state that while I am aware that the idea of heating a pulverized mineral substance in admixture with sodium nitrate is not new still I am not aware that sodium nitrate or its described equivalent or substitute has been added to pulverized blast-furnace slag for the purpose and in the manner described, nor that pulverized blast-furnace slag has ever been desulfurized completely in any practicable manner without such admixture.

The pulverulent roastings that are obtained by the treatment herein described have that in common with the pulverulent roastings of mineral wool (for which United States Letters Patent No. 278,002 were issued to me March 22, 1883) that they can be freed from accidental or still uncombined ferruginous impurities by leaching and washing, whereas slag that has been desulfurized in the molten state contains nearly all of these impurities in chemical combination; but they differ, essentially, from the mineral-wool roastings in their contents of alkalies as well as in their melting behavior. The desulfurized-mineral-wool roastings do not contain as a rule over one-half per cent. of alkaline constituents and after having been purified by leaching and washing have practically the melting behavior of a homogeneous silicate mass. The desulfurized-slag roastings, on the other hand, contain, in addition to their constitutional contents of alkalies, from three-quarters per cent. to one per cent. or more of sodium or potassium oxid in a fritted or incomplete state of combination, and on account of this incomplete state of combination the incipient fusion of the purified-slag roastings is accompanied by the formation of blow-holes or bubbles. The respective products are therefore easily distinguished from each other. Moreover, the product that is obtained from the treatment of pulverized slag costs only about half as much as that which is made from mineral wool, and it is therefore of greater commercial importance.

Having thus described my invention, I claim as new and desire to secure by Letters Patent—

Pulverulent desulfurized blast-furnace slag combined with and containing three-fourths of one per cent. and upward of sodium or potassium oxid in the fritted state substantially as herein set forth.

ALEXANDER DANIEL ELBERS.

Witnesses:
J. FRED. ACKER,
EVERARD BOLTON MARSHALL.